Jan. 16, 1934.  J. T. HORNI  1,943,440
REFLECTING UNIT FOR VEHICLES
Filed Oct. 3, 1930  3 Sheets-Sheet 1
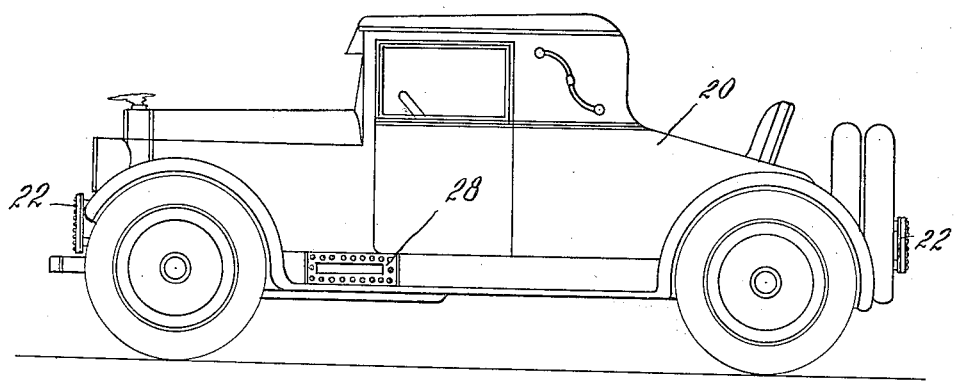
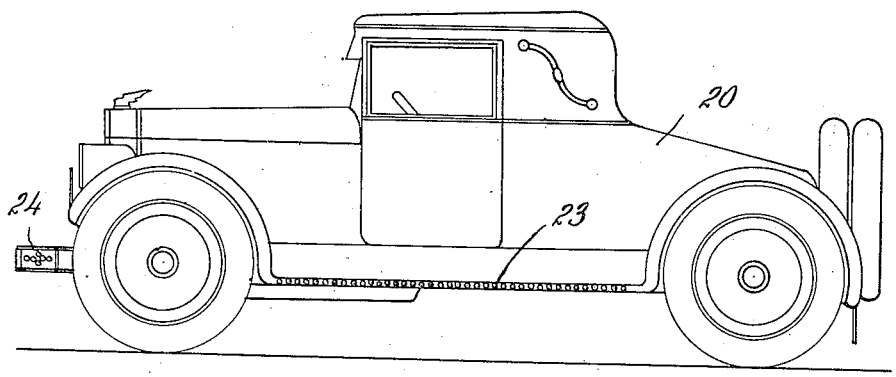
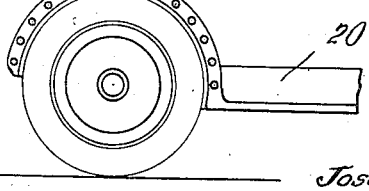
INVENTOR
Joseph T. Horni
BY
ATTORNEYS Jan. 16, 1934.   J. T. HORNI   1,943,440
REFLECTING UNIT FOR VEHICLES
Filed Oct. 3, 1930   3 Sheets-Sheet 2
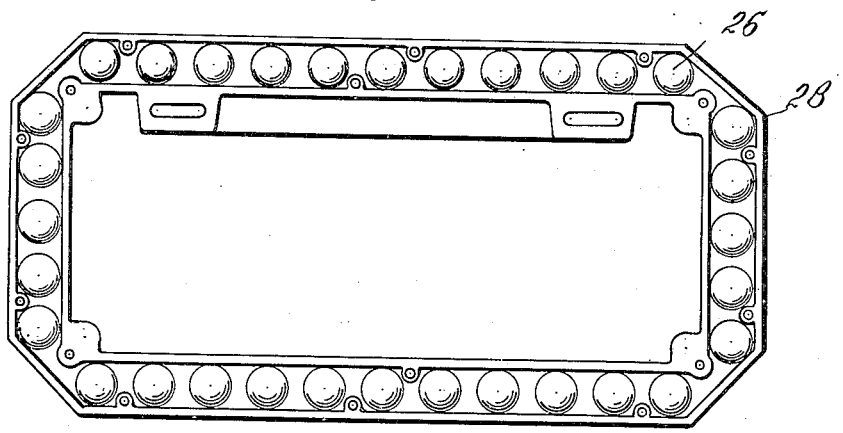
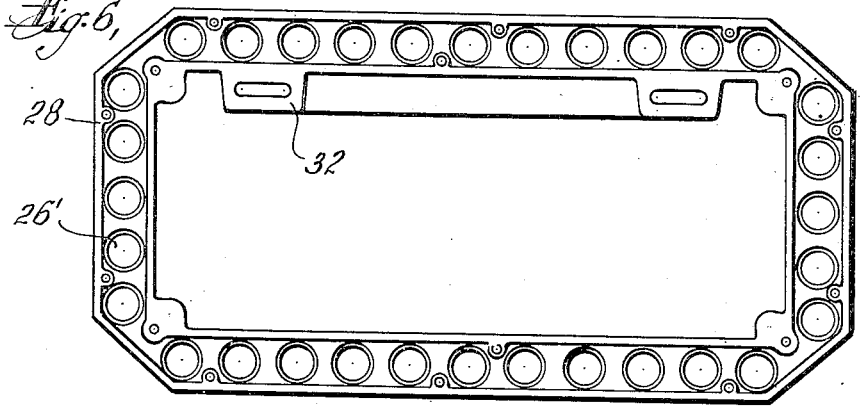
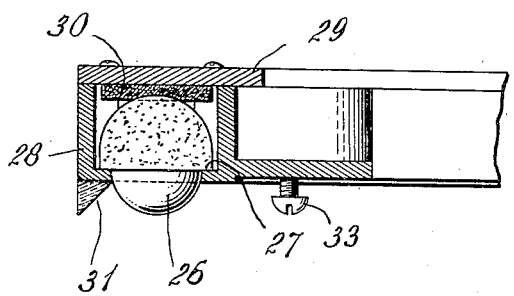
INVENTOR
Joseph T. Horni
BY
ATTORNEYS Jan. 16, 1934.   J. T. HORNI   1,943,440
REFLECTING UNIT FOR VEHICLES
Filed Oct. 3, 1930   3 Sheets-Sheet 3
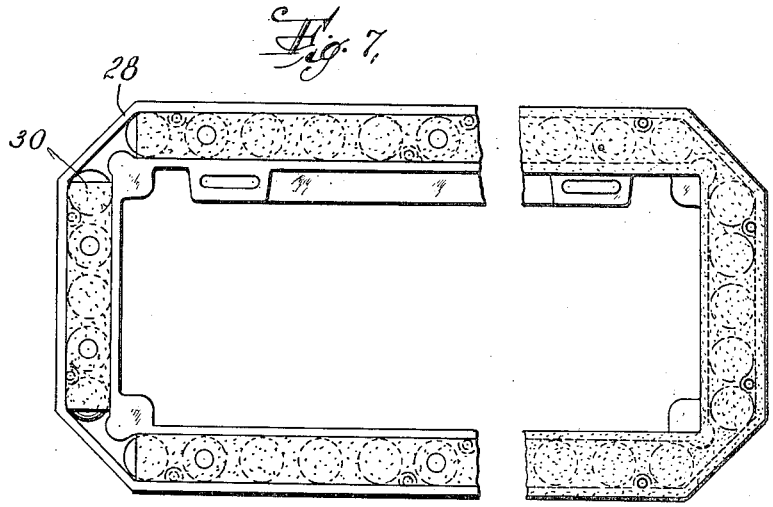
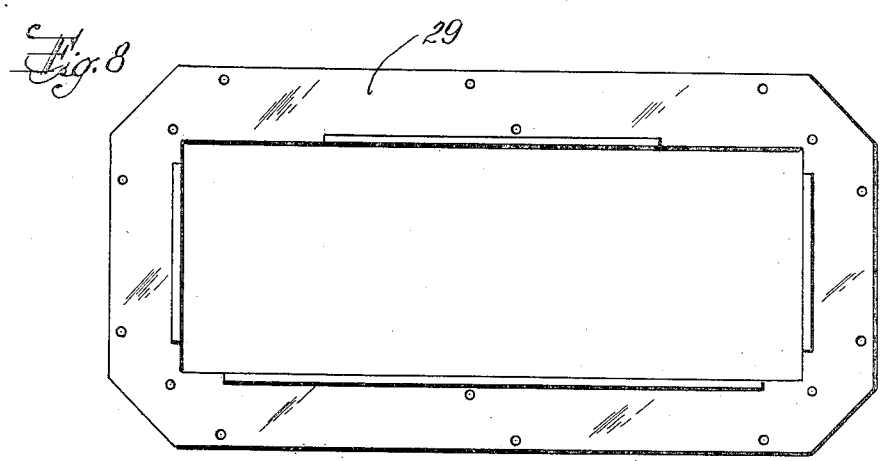
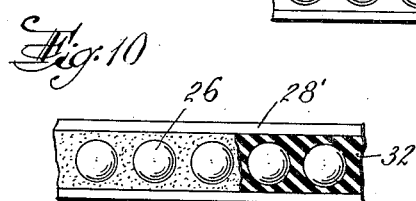
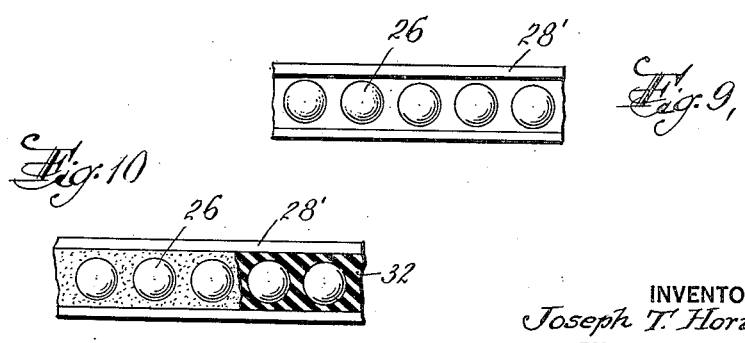
INVENTOR
Joseph T. Horni
BY
ATTORNEYS Patented Jan. 16, 1934

1,943,440

UNITED STATES PATENT OFFICE 1,943,440

REFLECTING UNIT FOR VEHICLES

Joseph T. Horni, Newark, N. J.

Application October 3, 1930. Serial No. 486,100

3 Claims. (Cl. 88—1)

This invention relates to a reflecting unit for vehicles and has particular reference to reflecting units for defining the limits of a vehicle, or defining certain portions thereof.

Frequently when an automobile is parked or stands along a street, the battery which energizes the parking or other lights of the automobile becomes discharged and the lights are extinguished, so that the vehicle is no longer clearly visible and is subject to being run into, with consequent damage and injury to it and to the colliding vehicle and its occupants. Also, vehicles, when viewed at night from the side, are frequently not readily perceptible, because the lights thereon are directed either forwardly or rearwardly, and this is also a frequent cause of collision between two vehicles travelling at right angles, and injury to both vehicles and their occupants.

It is the principal object of this invention to provide a reflecting unit which may be mounted anywhere on a vehicle either for defining the limits thereof, indicating its location, or for defining and/or illuminating some part of the vehicle such as the license plate. With this arrangement, the objections to the insufficient illumination of vehicles used heretofore, as enumerated above, are eliminated, for the reason that vehicles bearing the reflecting units of this invention are readily discernible at night by reflecting and redistributing outside light whether or not the lighting system of the vehicle has failed, and are viewable from the side, where the rays of the usual lamps of the vehicle are not visible.

For example, vehicles equipped with the new reflecting unit mounted on the side thereof, such as along the running board, fender, or the like, are readily seen by approaching vehicles when the rays of the head lights of the latter are reflected thereby in such a way that the vehicle ahead is perceptible to the driver of the approaching vehicle. Also, head lights of the vehicles, such as automobiles, locomotives and the like are of considerable intensity, and an object lying in the path of the same which does not reflect light is often invisible to the operator of the approaching vehicle. Many accidents have occurred at railroad grade crossings for this reason, but when a vehicle is equipped with the side reflecting units of this invention, the rays of the head light are reflected therefrom in such a way as to warn the operator of the approaching vehicle and prevent a collision. By this same side reflecting unit, the volume of traffic crossing a given intersection may be observed from a distance by the number of reflecting units which pass by, and also, when traffic is held up so that it accumulates across another street, the reflectors of the standing vehicles warn approaching vehicles that the street is blocked, whether or not it is equipped with traffic lights which may or may not be giving the "go" signal.

The reflecting unit of this invention accordingly comprises a double convex lens, one convex surface of which is preferably silvered so as to reflect rays of light collected by the open side of the lens, and to redistribute them at an angle so that they are clearly visible from a considerable distance. The unit preferably comprises a series of such reflectors arranged in any suitable way, preferably in a frame from which the open sides of the convex lenses project so as to gather light rays directed thereupon. As these lenses are separate units, they may be arranged in any suitable way to conform to the shape of a running board, fender, head light rim, license plate, or the like. In the arrangement where the reflectors are used on license plates or their holders, the latter are also equipped with an integral or auxiliary angle mirror or prismatic reflector, whereby light thrown on the latter is deflected to one side so as to illuminate the license number. With this arrangement, the license number of a vehicle which is fleeing an accident may be detected by reflected light, even though the operator of the fleeing vehicle has turned out the tail light of the vehicle so that the license may not be noted.

For a better understanding of the invention, reference is made to the accompanying drawings, in which .

Figs. 1, 2 and 3 are side views of vericles or parts thereof which are equipped with reflecting units of this invention;

Fig. 4 is an enlarged sectional view of one of the reflecting elements of these units, showing the manner of mounting the same in a frame or the like;

Figs. 5, 6, 7 and 8 illustrate various details of arranging the reflecting unit in the form of a license plate frame or holder; and Figs. 9 and 10 illustrate the manner of arranging the reflectors in the form of a strip unit, which may be secured to any portion of the vehicle.

In Figs. 1, 2 and 3 of these drawings, numeral 20 designates an automobile or part thereof which is equipped with the reflecting unit of this invention, Fig. 1 showing an oblong or frame type of reflecting unit 28 mounted on the splash guard of the running board of the automobile, and the front and rear license plates 22 equipped with the reflecting units or frames of the general type illustrated in Figs. 5 to 8, inclusive. Fig. 2 illustrates the manner in which the strip form of reflecting unit shown in Figs. 9 and 10 may be mounted along the edge of the running board 23 and the cluster arrangement 24 of the reflectors mounted on the end of the front bumper, while Fig. 3 shows a strip reflecting unit 25 mounted upon and shaped to conform to the front or rear fender of the automobile.

In the preferred arrangement which is shown in detail in Fig. 4, each reflector 26 constitutes a double convex lens, the rear or larger convex surface of which is silvered to form a mirror which reflects light gathered by the other convex surface. It will be seen that the curved surfaces of reflector 26 redistribute the reflected light so as to render them more visible, and the reflectors appear highly luminous even when a stray ray of light of low intensity is directed thereon. The rear convex surface of the reflector 26 is larger than the front convex surface, and a shoulder 27 is formed between them. In assembling the reflectors 26 in a frame 28, illustrated in detail in Fig. 6, to form the reflecting unit, the outer or smaller convex surface of the reflector 26 is inserted through apertures 26' of the frame 28, shown in Fig. 6, to the point where the shoulders of the reflectors 26 engage the back side of the frame 28 as illustrated in Figs. 4 and 5. In order to hold the reflectors 26 in place, a back plate 29, shown in detail in Fig. 8, is secured to the frame 28, and a cork or other resilient cushion 30 is interposed between the back plate 29 and the rear of the reflecting unit in order to protect it against shock and hold it resiliently in place, as shown in Fig. 7.

In an auxiliary arrangement, a prismatic strip reflector or angle mirror 31 is mounted along the outside edge of the frame 28 in order to reflect laterally any light which is directed upon the reflecting unit, and to reflect laterally the light which is directed thereon by the reflectors 26. It will be seen that the semi-spherical convex outer surface of the reflector 26 directs light in all directions, certain rays of which fall upon the strip reflector 31 and are in turn deflected laterally in the manner described.

These reflectors 26 may be mounted in frame 28 which is shaped in any desirable way, and which may serve for any desirable purpose. For example, as shown in Figs. 5 to 8, inclusive, the reflectors may be mounted in an open oblong frame and secured to the side of the automobile 20 as shown at 28 in Fig. 1, or these oblong frames may be shaped to surround a license plate. When the reflecting unit is arranged in this way to serve as a frame or holder for the license plate, it is equipped with lugs 32 which conform with the lugs on the license plate bracket of the automobile, through which the screws 33 are inserted for jointly securing the frame and the license plate to the bracket on the automobile in the usual way. The frame 28 serves not only as a holder for the reflecting units 26, but also is rigid and rugged so as to protect the license plate from bending or other damage, and serves as a neat and attractive frame therefor. In use, the reflector unit outlines and defines the license plate, and when the same is equipped with the angle or prismatic reflector 31 around the outer edge thereof as shown in Fig. 4, it directs reflected light upon the license numbers so that they are readily visible when light is reflected thereon, whether or not the tail light or the head lights of the vehicle are lighted.

In another arrangement, shown in detail in Figs. 9 and 10, the reflectors 26 may be mounted in a frame 28' arranged in strip form to be used along the edge of the running board, as at 23 in Fig. 2, around the edge of a fender as at 25 in Fig. 3, and other like installations, wherever a strip reflector is desired. In the strip arrangement shown in Fig. 9, the reflectors 26 are mounted in the frame 28' in the manner shown in Fig. 4. In a modified strip arrangement, the reflectors 26 are set in rubber 32 within the channel frame 28', and the frame 28' is flexible so that it can be bent to any shape, such as around the fender as shown in Fig. 3, and the like, and also to absorb shocks before they reach the glass reflectors 26. Individual reflectors 26 may be grouped in frames to form a character, legend, or the like, or simply a warning cluster, such as is shown at 24 in Fig. 2.

It will be seen that the new invention provides a very useful and effective accessory for automobiles, and when provided in various shapes to fit or conform to various parts of the automobile, it renders the same more visible and thus protects the automobile and traffic in general against collisions and the like which are frequently due to the imperfect illumination of a standing or approaching automobile, especially when it is not equipped with side lights, and/or when the lighting system of a parked or running automobile has failed. When the reflecting unit of this invention is mounted upon the side of an automobile, the beam of the head light of an approaching vehicle is redistributed thereby in such a way that it is immediately visible, no matter how feeble or intense the original light may be, and for this reason the device is especially valuable to indicate cross traffic, a vehicle stalled on a railway grade crossing, or traffic congestion across a highway not equipped with traffic lights or with traffic lights which indicate a clear road when this is not actually the case. The single reflectors of the unit may be arranged in any suitable way to frame or define an object such as a license plate, fender, bumper or the like, or the reflectors may be arranged to form a character, legend, advertisement, license number, or the like.

While several preferred embodiments of this invention have been illustrated and described herein, it is to be understood that the invention is not limited thereby, but is susceptible of changes in form and detail within its scope.

I claim:

1. In a reflector unit, the combination of a frame adjacent an object to be illuminated, a reflector button thereon for locating the object by reflecting light from a remote source, and an angle reflector mounted adjacent said button and extending beyond it for reflecting light from said remote source on the object to illuminate the same, said reflector and strip having a wide angle of reflection for directing reflected light upon each other.

2. In a reflector unit, the combination of a frame adjacent an object to be illuminated, a reflector strip mounted on the frame and positioned at an angle adjacent the object for reflecting light from a remote source on the object to illuminate the same, and a reflector button mounted between the strip and the object to locate the latter by reflecting light from the remote source, said strip extending beyond the button and said button having a wide angle of reflection for directing light upon said strip.

3. In a reflector unit, the combination of an open frame containing an object to be illuminated, a plurality of spaced reflectors mounted upon said frame adjacent the object for locating the object by reflecting light from a remote source, and a reflector strip mounted on the frame outside of but adjacent to the reflectors and positioned at an angle to direct light reflected thereby upon said reflectors and upon said object to illuminate the same.

JOSEPH T. HORNI.